United States Patent [19]

Patterson

[11] Patent Number: 4,515,395
[45] Date of Patent: May 7, 1985

[54] ADJUSTABLE VEHICLE SEAT BELT ANCHORAGE

[75] Inventor: Michael Patterson, Carlisle, England

[73] Assignee: Kangol Magnet Limited, Carlisle, England

[21] Appl. No.: 489,325

[22] Filed: Apr. 28, 1983

[30] Foreign Application Priority Data

Apr. 28, 1982 [GB] United Kingdom ............... 8212301

[51] Int. Cl.³ .................. B60R 21/10; A62B 35/00
[52] U.S. Cl. ................................. 280/808; 297/483
[58] Field of Search ............... 280/808, 801; 297/483, 297/486, 487

[56] References Cited

U.S. PATENT DOCUMENTS

| 4,023,826 | 5/1977 | Kokubo | 297/483 |
|---|---|---|---|
| 4,191,400 | 3/1980 | Smith | 297/483 |
| 4,247,131 | 1/1981 | Fiehl | 280/808 |
| 4,311,323 | 1/1982 | Provensal | 280/808 |
| 4,372,012 | 2/1983 | Fohl | 297/483 |

FOREIGN PATENT DOCUMENTS 2536665 3/1977 Fed. Rep. of Germany .
2015321 2/1979 United Kingdom .

Primary Examiner—Richard A. Bertsch
Attorney, Agent, or Firm—Young & Thompson

[57] ABSTRACT

An adjustable shoulder anchorage for a vehicle seat belt system comprises a length of webbing secured in the vehicle to extend generally upright in the region of the shoulder of the user of the system, and a connector having a running loop for the belt integrally formed therewith or secured thereto and movable to a selected position along the webbing. The webbing extends through a slot in the connector and reverses its direction around fixed and movable transverse bars of the connector between which the webbing is snubbed to securely hold the connector in the selected position.

12 Claims, 3 Drawing Figures

ADJUSTABLE VEHICLE SEAT BELT ANCHORAGE

BACKGROUND OF THE INVENTION

The invention relates to an adjustable vehicle seat belt anchorage for use in or with a vehicle seat belt system having a shoulder or diagonal belt.

Vehicle seat belt systems conventionally include a belt arranged to extend in use diagonally across the torso of the occupant of a seat with which the system is associated. This diagonal or shoulder belt or belt portion is usually continued from a securement position at its lower end, which position may be constituted by a manually releasable buckle, across the user's lap, to another securement position or anchorage on the other side so that the system constitutes a three-point or lap and diagonal system.

The diagonal belt normally extends downwardly from a position in the vehicle defined by a vehicle anchorage or by a running loop through which the belt extends from a retractor for example an emergency locking retractor. To enable this position to be adjustable to suit users of different shoulder heights it has been proposed in GB 2 015 321 A (KL 75) to provide a strap fixed in place independently of the seat belt system, to which a shoulder belt extending from an anchorage can be secured by a connector slidable along the strap. The connection to the elongate member strap does not have to carry the load that would be imposed on the seat belt in emergency conditions and the strap is merely received through the apertures between three parallel bars of the connector. Also, in DE-OS 25 36 665 (FIGS. 7 and 8), a seat belt extends from a retractor upwardly to and downwardly from a guide loop of a connector movable along belt length for height adjustment. Again the belt length extends through the apertures between three parallel bars of the connector, so there is not much resistance to movement of the connector along the belt length, contrary to what would be essential to the security of the system under emergency conditions.

It is accordingly an object of the invention to provide an adjustable shoulder anchorage for a vehicle seat belt system in which a connector for supporting a shoulder belt or belt portion is selectively movable along a flexible member, the connector being positively engaged therewith so as to be substantially immovable therealong under emergency loading of the shoulder belt.

It is also an object of the invention to provide an adjustable shoulder anchorage for a shoulder belt of a vehicle seat belt system which can be readily installed either as original equipment or by way of modification of an existing seat belt system.

SUMMARY OF THE INVENTION

Accordingly the invention can provide an adjustable shoulder anchorage for a vehicle seat belt system, the anchorage comprising an elongate flexible member which can be secured to extend generally upright in the region of the shoulder of an occupant of the vehicle seat with which the system is associated, a support device or connector having a support for the seat belt and transverse elements between which the flexible member extends so that the device is movable to a selected position along the flexible member, the transverse elements comprising two bars about each of which the flexible member substantially reverses direction.

At least one of the transverse elements can be mounted for movement on the device so as to enhance engagement between the device and the flexible member in response to tension in the seat belt, as by snubbing the flexible member between the transverse elements. The at least one movably mounted transverse element can have a manually engageable portion for movement on the device in a direction to release the engagement between the device and the flexible member. The connector device can have opposed side walls joined by one of the transverse elements and having aligned slots guiding the other transverse element for sliding movement therein. The side walls can be provided by a channel member of which the centre web is slotted to define the one transverse element and also an aperture below the two transverse elements through which the flexible member downwardly extends.

When installed as original equipment, the connector device may have at its lower end a slot providing a running loop through which the seat belt extends. The belt can however be selectively fitted to the connector device, and when the anchorage of the invention is provided for after market use, the connector device can be adopted to have an existing running loop or other belt connection device secured to it after detachment from the vehicle, so that re-threading of the belt is not required.

BRIEF DESCRIPTION OF THE DRAWINGS

For a better understanding of the invention, reference may be made to the following illustrative description and the accompanying drawing, in which.

Figure 1:
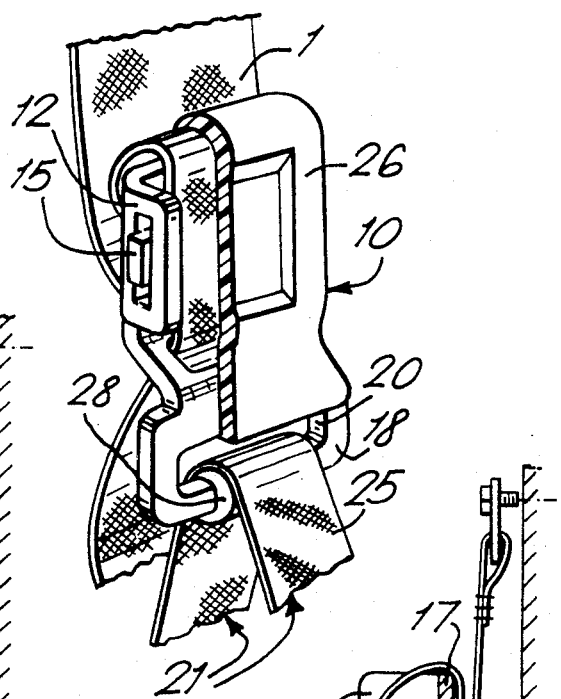
FIG. 1 is a partial perspective view of an adjustable shoulder anchorage embodying the invention, shown partially broken away.
Figure 2:
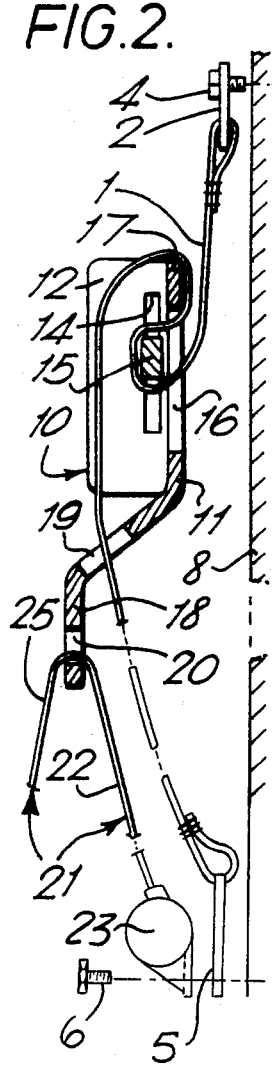
FIG. 2 is a sectional side view of the anchorage of FIG. 1.

The adjustable shoulder anchorage shown in FIGS. 1 and 2 comprises a length of webbing 1 having its upper end looped through a first end element comprising a slot in a bracket 2 and secured to itself as by stitching, the bracket being apertured for reception of a bolt 4 or other fastener whereby the bracket is fixed within a road vehicle above and to one side of a driver's or passenger's seat. The part of the vehicle frame to which the attachment is made can be as shown a pillar 8 between the front and rear doors of a passenger vehicle. The bolt 4 is received in first fixed securements means comprising a tapped hole formed in the pillar. From the attachment bracket 2 the webbing 1 extends generally vertically downwardly through a connector or locking device 10 to a second end element comprising a bracket 5 to which it is again connected by being looped through a slot in the bracket and secured to itself. The second bracket 5, like the bracket 2, is secured to the pillar 8 by a bolt 6 or other suitable fastener received in second fixed securement means comprising a tapped hole in the pillar.

The locking device 10 comprises a metal pressing having a channel portion with a centre web 11 and side webs 12 which extend generally upright. The side webs 12 have aligned upright slots 14 within which respective ends of a second bar comprising a snubber bar 15 spanning across the channel portion are slidably received. From the centre web 11, which is apertured at 16, to define a first bar comprising a transversely extending bar 17 at the upper end of the device, an inclined extension portion projects downwardly and outwardly from the pillar 8 beyond the side webs, to join a third bar comprising an end portion 18 extending generally parallel to the centre web. The inclined extension portion includes an aperture 19 and the end portion 18 has a transverse slot 20.

The webbing 1 extends downwardly from the bracket 2 through the centre web aperture 16 to beneath the snubber bar 15, around the snubber bar, back through the centre web aperture 16, upwardly and forwardly around the bar 17, and then downwardly in front of the snubber bar through the aperture 19 and so as to the lower bracket 2. The webbing 1 thus reverses direction about both the snubber bar 15 and the bar 17 and the device 10 is held in this orientation with respect to the webbing by its extending through the aperture 19.

The transverse slot 20 at the lower end of the locking device 10 receives therethrough a seat belt 21 having a portion 22 extending upwardly from a fixed retractor device 23, from which the belt can be withdrawn for use against the tension of a rewind spring. As is conventional, the retractor suitably includes a mechanism for locking against belt withdrawal in response to emergency conditions, which may be sensed by means in the retractor responsive to one or both of vehicle deceleration or belt withdrawal acceleration beyond predetermined amounts. From the slot 20, a portion 25 of the belt 21 extends diagonally downwardly in use across the torso of the occupant of the associated seat, conveniently to one portion of a separable two-part buckle (not shown), through which it extends across the lap of the user to a permanent end anchorage which may be located in the vicinity of the retractor. It will be understood that the invention is not concerned with the precise belt configuration or with the nature of the retractor, which can be chosen according to requirements.

In use, the length of the webbing 1 will be adjusted so that the webbing is closely entrained around the bars 15 and 17 instead of loosely as shown for purposes of illustration. The webbing 1 thus substantially reverses direction around each bar, the device 10 being held generally in the orientation shown by the engagement of the webbing in the aperture 19. The entrainment of portions of the webbing 1 around the bars 15,17, and engagement of the webbing with these portions, effectively opposes sliding of the device 10 along the webbing and this opposition is enhanced by tension in the seat belt which causes upward movement of the bar 15 relative to the bar 17 whereby the webbing is snubbed between the two bars. Nevertheless, the device 10 and thus the position of the slot 20, can be adjusted generally vertically, by sliding the device along the length of the webbing 1. If need be, the ends of the snubber bar 15 can be acted upon manually to assist movement of the device. The effective position, defined by the slot 20 from the shoulder belt extends downwardly across the torso of the user can thus be selectively adjusted over the whole length of the webbing 1 between the upper and lower brackets 2 and 5.

It will be evident that the tension in the seat belt 21 experienced normally because of the rewind spring in the retractor, and the extreme additional tension experienced in emergency conditions when the retractor is locked against belt withdrawal, will result in a downward pull on the locking device 10, which will enhance the snubbing interaction of the snubber bar and the webbing 1, so that the locking device is firmly held in position, even in emergency conditions, and can be moved up and down only by deliberate actuation.

As shown in FIG. 1 only, the locking device 10 can mount, if desired, a plastics cover 26 which clips onto the metal pressing and is shaped to provide access to the ends of the snubber bar. To minimise wear on the seat belt 21, the part of the device 10 defining the lower edge of the aperture 20 can be provided with a lining 28 of plastics material.

Figure 3:
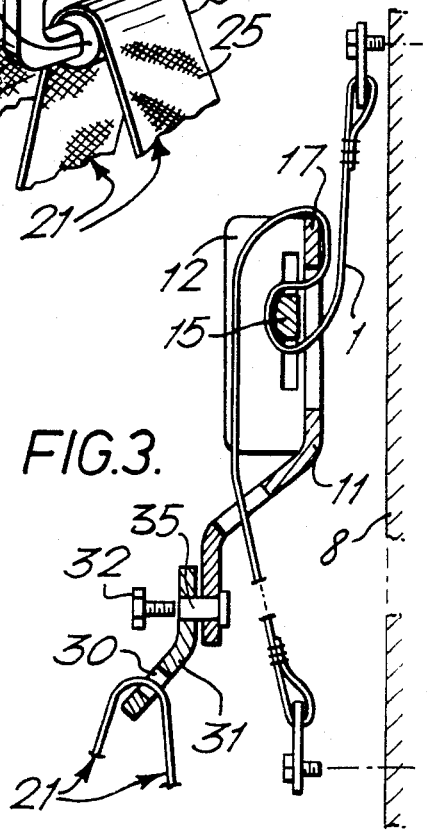
FIG. 3 is a sectional side view of a modified form of the anchorage of FIGS. 1 and 2.

The anchorage illustrated in FIGS. 1 and 2 is appropriate for use as original equipment in a vehicle, but the invention can be readily embodied in an anchorage obtained by a simple modification of a conventional seat belt system, as shown in FIG. 3, in which parts similar to those of the anchorage of FIGS. 1 and 2 are given the reference numerals used in those figures.

In the conventional system to be modified, the seat belt 21 again extends upwardly from a retractor to extend through a transverse slot 30 in a running loop 31 secured to the pillar 8 at a fixed position by means of a bolt 32 extending through a mounting hole in the running loop and received in a tapped hole, typically at the position of the tapped hole receiving the bolt 4 in FIGS. 1 and 2. In accordance with the present invention, the running loop 31 is removed from the pillar 8 on which the webbing 1 is then installed by means of the brackets 2,5. The running loop 31 is then connected to the locking device 10, and to enable this to be done, the device is modified by the provision of a round hole 34 in place of the transverse slot 20. Third securement means comprising a sleeve 35 extends from a flange formed at one end thereof through the hole 34 and the mounting hole of the running loop 31 and is internally threaded to receive in its forward end a fastener for the running loop, preferably the bolt 32 by which the loop was originally secured to the pillar 8. The operation of the anchorage of FIG. 3 is then essentially similar to that of the anchorage of FIGS. 1 and 2.

The length of the webbing 1 in either anchorage illustrated is of course selected according to requirements, and may be relatively short, to allow adjustment for adults only, or relatively long to allow adjustment for adults and children also. The bolt 4 may be received in the tapped hole provided for a conventional running loop such as that of FIG. 3, and the bracket 5 may be secured to the vehicle by a specially provided tapped hole or by way of the retractor mounting. Either or both ends of the webbing 1 can be secured at specially provided securement fittings if appropriate.

It will thus be evident that the invention can be embodied in a variety of ways other than as specifically described.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. An adjustable shoulder anchorage device for a vehicle seat belt, comprising:
   a flexible elongate member;
   means mounting said flexible elongate member to extend generally upright between upper and lower securement means in the region of the shoulder of an occupant of a vehicle seat belt with which said vehicle seat belt system is associated;

connector means having spaced generally parallel bar means engaged with said flexible elongate member whereby said connector means can be retained in a selected position along said flexible elongate member; and support means for supporting said vehicle seat belt said support means being carried by said connector means, wherein said bar means comprise first, second and third bars with said second bar between said first and third bar, and wherein said elongate member extends from one of the said securement means past said first bar to said second bar, reverses the direction thereof around said second bar, extends between itself and said first bar, reverses the direction thereof around said first bar, and extends to the other of said securement means between said second and said third bar.

2. The adjustment shoulder anchorage means of claim 1 having means mounting said second bar for movement on said connector means in response to tension in said vehicle seat belt to enhance said engagement between said flexible elongate member and said first and second bars.

3. The adjustable shoulder anchorage means of claim 2 wherein said movement of said second bar is such as to snub said flexible elongate member between said first and second bars.

4. The adjustable shoulder anchorage means of claim 3 having means on said movable second bar for manual operation thereof to release said snubbing engagement between said flexible elongate member and said first and second bars.

5. The adjustable shoulder anchorage means of claim 2 wherein said connector means comprises a channel member having a center wall and opposed side walls, wherein said center wall is apertured to define said first and third bars, and wherein said second bar is slidably guided in slots in said side walls.

6. The adjustable shoulder anchorage means of claim 5 wherein said support means is located on a portion of said center wall extending from said first and second bars beyond said third bar.

7. The adjustable shoulder anchorage means of claim 6 wherein said support means comprises a slot in said center wall extending parallel to said bars.

8. The adjustable shoulder anchorage device of claim 1 further comprising fastener means detachably connecting said support means to said connector means, and wherein at least one of said mounting means comprises a mounting member and another fastener means securing said mounting member to one of said securement means, the two said fastener means being interchangeable.

9. An adjustable shoulder anchorage means for a vehicle seat belt, comprising:

an elongate flexible member;

first and second end elements at respective ends of said flexible member;

first and second fastener means for securing said end elements respectively to first and second fixed securement means within a vehicle whereby the elongate flexible member extends generally upright between said securement means in the shoulder region of a user of said seat belt system;

a slide member;

means engaging said slide member with said flexible elongate member for movement therealong to a selected position;

third securement means on said slide member;

seat belt carrier means; and third fastener means securing said seat belt carrier means to said slide member by way of said third securement means, said third fastener means being capable of securing said seat belt carrier means to at least one of said first and second fixed securement means.

10. The adjustable shoulder anchorage means of claim 9 further comprising seat belt retractor means storing said seat belt therein and means mounting said retractor in said vehicle, and wherein said seat belt carrier means comprises a running loop and said seat belt extends upwardly from said retractor means through said running loop.

11. The adjustable shoulder anchorage means of claim 9 wherein said means mounting said retractor means mounts said retractor at the lower of said first and second securement positions.

12. The adjustable shoulder anchorage means of claim 9 wherein said means mounting said slide member on said flexible elongate member comprise two spaced generally parallel bar means about each of which said flexible elongate member reverses its direction and a third bar means spaced from said two spaced bar means and engaged by said flexible elongate member.

* * * * *